United States Patent [19]

Ruschkofski et al.

[11] Patent Number: 4,665,279

[45] Date of Patent: May 12, 1987

[54] PROTECTIVE CONTAINER FOR TRANSMISSION CABLE SPLICE

[75] Inventors: Gerald J. Ruschkofski; William A. Byrd, both of Columbia, S.C.

[73] Assignee: MPX Systems, Inc., Columbia, S.C.

[21] Appl. No.: 846,034

[22] Filed: Mar. 31, 1986

[51] Int. Cl.⁴ .................... H02G 7/00; H05K 5/04
[52] U.S. Cl. .................... 174/40 R; 98/83; 98/122; 174/16 R; 174/44; 174/50; 248/219.1
[58] Field of Search ............ 174/16 R, 38, 40 R, 174/44, 45 R, 50, 52 R, 60; 98/83, 122; 248/218.4, 219.1, 219.2, 219.3, 219.4, 230; 211/107

[56] References Cited

U.S. PATENT DOCUMENTS

| | | | |
|---|---|---|---|
| 5,183 | 7/1847 | Emerson | 98/83 |
| 292,848 | 2/1884 | Patterson | 174/44 X |
| 637,894 | 11/1899 | Procunier | 174/44 |
| 787,442 | 4/1905 | Flynt et al. | 174/139 |
| 941,668 | 11/1909 | Williams | 98/122 |
| 1,177,867 | 4/1916 | Johnson | 174/139 |
| 1,280,172 | 10/1918 | Culligan | 174/139 X |
| 1,479,669 | 1/1924 | McClain | 174/139 |
| 3,337,681 | 8/1967 | Smith | 174/92 |
| 3,545,773 | 12/1970 | Smith | 174/92 X |
| 4,371,757 | 2/1983 | Debortoli et al. | 174/44 X |

FOREIGN PATENT DOCUMENTS 14013 of 1905 United Kingdom .................. 174/60
721849 1/1955 United Kingdom .................... 98/83

OTHER PUBLICATIONS

Copies of pages 136336 through 136344 of a brochure of Hughes Brothers of Seward, Nebr., entitled "Fiber Optic Protective Splice Case, Prototype Rifle Test", Sep. 27, 1984.

Primary Examiner—Laramie E. Askin
Attorney, Agent, or Firm—Luke J. Wilburn, Jr.

[57] ABSTRACT

A protective container for aerially disposed splice packages of transmission cables comprising an elongate, cylindrical pipe formed of high-strength, projectile-resistant material for containing a transmission cable splice package therein, brackets for attaching the cylindrical pipe to the side of a transmission cable support pole with its longitudinal axis generally vertically disposed, a first generally circular, projectile-resistant top plate fixed to the top of the pipe in close vertically spaced relation to overlie the top opening and provide a peripheral opening at the top of the pipe for passage of air, a second generally circular, projectile-resistant bottom plate removably secured to the bottom of the pipe to close the bottom opening thereof and provide a radially disposed slot therein for passage of a transmission cable into and out of the pipe, and a transverse bolt spanning the diameter of the pipe above the bottom plate to supportably retain a transmission cable splice package within the container.

6 Claims, 4 Drawing Figures

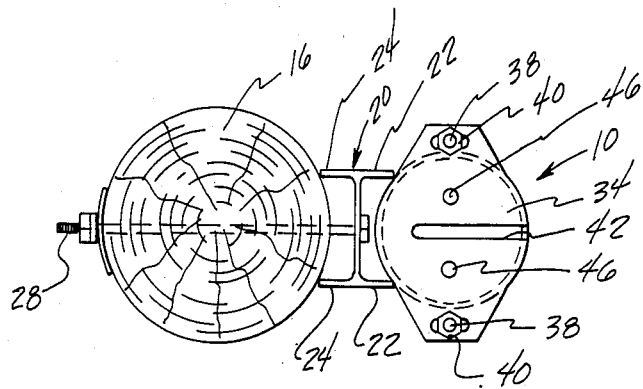
Fig. 2.
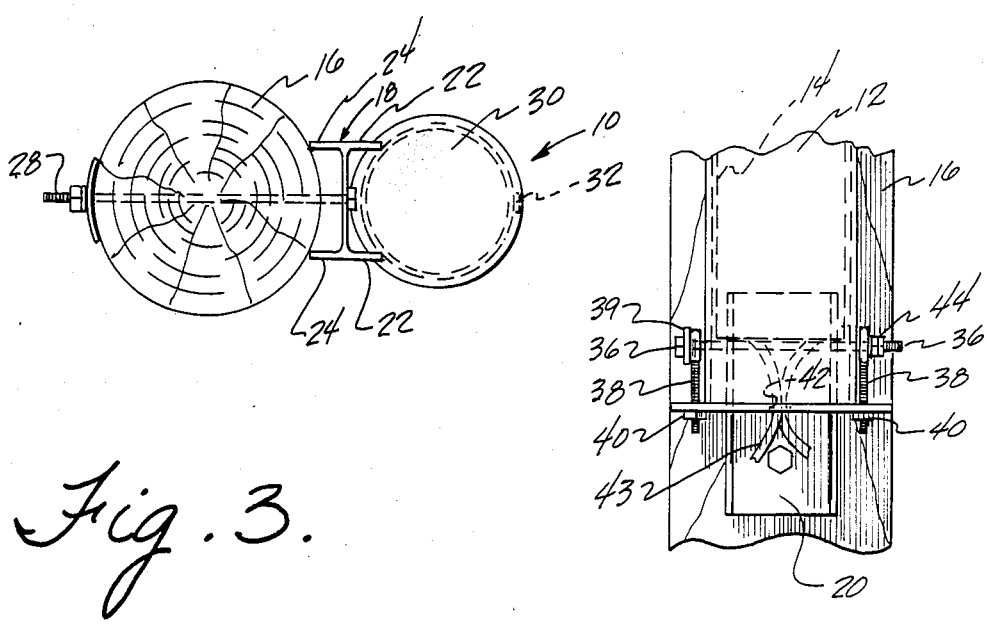
Fig. 3.
Fig. 4.

PROTECTIVE CONTAINER FOR TRANSMISSION CABLE SPLICE

The present invention is directed to a protective container for an aerially disposed transmission cable splice, and more particularly, such a container which is particularly designed to protect splice packages of fiber optic transmission cables against damage by projectiles, such as bullets fired by hunters and vandals.

BACKGROUND OF THE INVENTION

It is known to provide aerially disposed containers to receive, support, and protect electrical and communication cable connections. Such containers generally consist of relatively light-weight sheet metal boxes having a hinged access door and containing insulated support panels for electrical interconnection of wires of transmission cables directed into the boxes through openings provided therein. Such boxes may be mounted in suitable locations, such as aerially on line poles, and protect interconnections and terminal head panels against the elements of weather.

Typical of such protective container constructions are disclosed in the following U.S. patents: U.S. Pat. Nos. 292,848; 637,894 and 4,371,757.

Aerially mounted terminal boxes for transmission cables, as well as electrical and ceramic wire insulators, because of their aerially disposed locations, are often the target of the weapons of hunters, vandals, and the like. Bullets and other projectiles fired or thrown at such transmission equipment can readily damage and disable the transmission lines, requiring replacement and repair at added expense.

It has been known to provide bullet-resistant covers and shields for power line ceramic insulators. Certain of such insulator protective cover constructions are disclosed in the following U.S. patents: U.S. Pat. Nos. 787,442; 1,177,867; 1,280,172; and 1,479,669.

It has also been known to provide a protective case for fiber optic cable splices which is designed to resist damage by projectiles or bullets. Such device, advertised by Hughes Brothers of Seward, Neb., comprises a tubular metal pipe approximately 40" in length and 10½" outside diameter. The pipe is mounted on the side of a transmission line pole with its longitudinal axis vertically disposed by a pair of generally U-shaped brackets which are welded to the upper and lower end portions of the pipe and have bolts or lag screws for securing the brackets to the pole. The upper end of the pipe is sealed by a circular metal plate which has a larger diameter than the pipe and is secured to the pipe by bolts and lock nuts spaced about the periphery of the plate which engage brackets on the upper end of the pipe.

The lower end of the pipe is closed by a pair of semi-circular plates which are secured to the pipe by bolts and lock nuts located about their periphery. The two semi-circular plates, along their abutting diameter edges, are notched to form an elongate slot for passage of a fiber optic cable into and out of the lower end of the container. The splice of the fiber optic cable, which may be enclosed in a light-weight weather-proof plastic or metal cover, is thus located within the hollow pipe for aerial support and protection against projectiles.

BRIEF OBJECTS OF THE PRESENT INVENTION

It is an object of the present invention to provide an improved projectile-resistant container of the general type abovedescribed for protecting aerially disposed transmission cable splices.

It is a more specific object to provide an improved projectile-resistant protective container for aerially disposed transmission cable splices which has improved dissipation of heat from the container and protection of a splice package contained therein.

It is a further specific object of the present invention to provide a protective container for aerially disposed transmission cable splices, particularly fiber optic cable splices, which is of relatively simple and economical construction, and may be readily mounted on the side of a transmission line pole to receive, support, and protect the splice package against damage by bullets of hunters and vandals.

BRIEF SUMMARY OF THE INVENTION

The present invention comprises a container for aerially disposed transmission cable splices, in particular, fiber optic cable splice packages, to protect the same against the elements of weather and damage by bullets and projectiles of hunters and vandals. The container consists of an elongate cylindrical pipe formed of high-strength projectile-resistant material, such as steel, for supportably containing a transmission cable splice package therein. The cylindrical pipe includes flanged mounting means for attaching the pipe to the side of a transmission pole with its longitudinal axis vertically disposed. The upper and lower ends of the pipe are provided with generally circular closure plates. The upper plate is fixedly attached to the upper end of the pipe in vertically spaced relation from the end of the pipe to provide air flow through the pipe and dissipation of heat from the container. The lower closure plate has a radial slot for the entrance and exit of a transmission cable, and is removable to permit the insertion of a transmission cable splice package into the container. The splice package is supported above the bottom of the pipe and lower closure plate on a cross-rod which spans the pipe diameter to facilitate air flow around the package and reduce chances of damage to the splice package by projectiles striking the lower portion of the container.

BRIEF DESCRIPTION OF THE DRAWINGS

The above, as well as other objects of the present invention, will become more apparent and the invention will be better understood from the following detailed description of a preferred embodiment of the invention, when taken with the accompanying drawings, in which:

FIG. 2 is a bottom plan view of the container of FIG. 1;

FIG. 3 is a top plan view of the container of FIG. 1; and

FIG. 4 is a right side elevation view of the lower end portion of the container, as seen in FIG. 1.

DETAILED DESCRIPTION OF PREFERRED EMBODIMENTS

Figure 1:
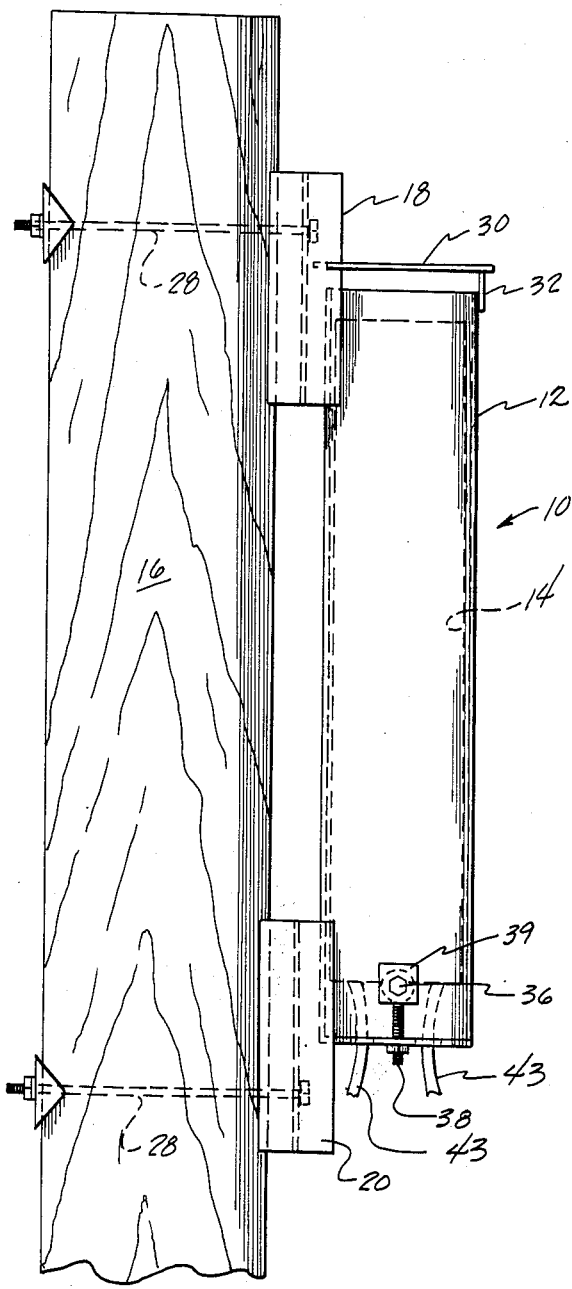
FIG. 1 is a side elevation view of a transmission cable protective container of the present invention.

Referring more specifically to the drawings, the protective container 10 of the present invention comprises an elongate, cylindrical pipe 12 formed of high-strength, projectile-resistant material, such as steel, for supportably receiving and containing a transmission cable splice package 14 (shown in broken lines), such as a fiber optic cable splice package, therein. The pipe is supportably attached to the side of a transmission line pole 16 by a pair of I-shaped, wide flange steel brackets 18, 20 attached to the upper and lower end portions of the pipe 12. As seen, in FIGS. 2 and 3 two parallel legs 22 of each bracket are fixedly secured to the outer surface of the wall of the pipe, as by welding, and the oppositely disposed legs 24 of each bracket frictionally engage the side surface of the transmission pole 16 to dispose the pipe with its longitudinal axis generally vertical. The central web portion of each bracket has an opening for receipt of an elongate bolt 28 which extends through the transmission pole to fix and secure the protective container at a desired location on the side of the pole.

Located at the top end of the pipe is a first generally circular, projectile-resistant metal plate 30 which is fixed to the top of the pipe 12 in vertically spaced relation by weld attachment to legs 22 of bracket 18 and by a metal spacer bar 32 (FIG. 1) which is welded to the underside of the plate and the wall of the pipe. The spaced relation of the top plate 30 provides a peripheral opening at the top of the pipe for passage of air and heat from the interior of the container.

Removably secured to the bottom of the pipe is a second generally circular plate 34 of projectile-resistant material, such as steel. As seen in FIG. 4, the lower wall portion of pipe 12 is provided above its lower end with opposed, axially-aligned openings which receive an elongate bolt 36. Bolt 36 extends across a diameter of the interior of the pipe and has end portions protruding radially outwardly of the walls of the pipe. The end portions of the bolt supportably receive eye-bolts 38 which extend downwardly below the end of the pipe and through slotted openings in outwardly extending peripheral edge portions of plate 34.

Bottom closure plate 34 is provided with a radial slot 42 extending inwardly of the outer edge of the plate. The slot permits ready insertion of the ends of transmission cables 43 (FIG. 1) which pass upwardly in the pipe to the transmission splice package 14 supported above the lower end of the pipe on support bolt 36. Eye-bolts 38 are secured on the ends of the support bolt 36 by a washer 39 and the bolt head, and by threadably received nuts 44 (FIG. 4). The lower plate 34 is secured to the bottom edge of pipe 12 by nuts 40 received on the threaded ends of the eye-bolts.

Additional small circular openings 46 (FIG. 2) are provided in the bottom closure plate 34 to increase air flow through the container to dissipate heat build-up caused by sunlight energy on the metal walls of the container.

As heretofore mentioned, the protective container of the present invention is formed of a high-strength material, such as ASTM A-36 steel, to resist penetration by rifle bullets, buckshot, and other projectiles which may be directed thereat by hunters and vandals. In one embodiment, the cylindrical pipe 12 may be of about 8½" diameter, and the upper and lower plate members closing the ends of the pipe may be formed of about ¼" thickness steel plate. Conveniently, the pipe may be around 40" long and secured to a transmission pole by steel flanged brackets approximately 12" long attached to the upper and lower side wall areas of the pipe. The support bolt 36 which maintains the splice package above the bottom plate of the container may be located approximately 3" or more above the bottom plate 34.

In use of the protective container for aerial support and protection of a transmission cable splice package, such as a fiber optic cable splice, pipe 12 of the container is attached to the side of a transmission pole by brackets 18, 20 and bolts 28, with its longitudinal axis generally vertically disposed. Ends of two fiber optic transmission cables 43, containing multiple ends of optical fibers therein, are spliced by workmen at a transmission line pole location. The splice package 14 may be enclosed in a suitable light-weight, weather-resistant plastic or metal cover. One such cover or splice case which may be used to seal the splice package and be received within the container of the present invention is disclosed in U.S. Pat. Nos. 3,337,681 and 3,545,773. The covered splice package is located in the container above the bottom opening of the pipe and support bolt 36 is inserted through the aligned openings in the lower wall of the pipe beneath the package to retain it above the lower end of the pipe. The eye-bolts 38 are supported on the ends of bolt 36 and end portions of the transmission cables 43 are located in the receiving slot 42 of the bottom closure plate. Plate 34 is then secured to the bottom of the pipe 12 by eye-bolts 38 and nuts 40.

The openings in the bottom plate 34 and the spaced disposition of the top plate 30, about 1" from the upper edge of the pipe, provide air flow and a chimney effect in the pipe to dissipate heat produced in the container by solar energy. The exterior of the container may be painted a light-reflective color to reduce heat build-up in the container.

The cylindrical shape of the vertical walls of the container in its aerial disposition on a transmission line pole facilitates deflection of projectiles, such as rifle bullets and shotgun pellets, from entering the container. In addition, by supporting the splice package 14 on bolt 36 a spaced distance above the bottom closure plate 34 of the container, any bullet or projectile striking the bottom plate, if it does penetrate the same, will be less likely to strike and damage the splice package.

Although the container of the present invention is particularly suited for aerial support and protection of fiber optic communication cable splice packages, it may be employed to aerially support and protect all type transmission cable splices, with insulation being provided and employed, if required, to electrically insulate the conducting elements of the package from the container.

That which is claimed is:

1. A protective container for aerially disposed splice packages of transmission cables comprising
 (a) an elongate cylindrical pipe formed of high-strength, projectile-resistant material for containing a transmission cable splice package therein;
 (b) means for attaching the cylindrical pipe with its longitudinal cylindrical axis generally vertically disposed to a side of a transmission cable support pole;
 (c) a first generally circular, projectile-resistant top plate fixed to the top of the pipe in close, vertically-spaced relation to overlie the top opening of the pipe and provide a peripheral opening at the top of the pipe for passage of air;
 (d) a second generally circular, projectile-resistant bottom plate secured to the bottom of the pipe to close the bottom opening thereof, said second plate having a radially disposed slot therein for passage of a transmission cable into and out of the pipe; and (e) support means in the pipe for supportably positioning a transmission cable splice package therein in spaced relation above the bottom plate of the container, said support means including bolt means extending across the diameter of the pipe and through axially aligned openings in a lower wall portion of the pipe, end portions of the bolt means extending radially beyond the outer wall surfaces of the pipe, and eye-bolt means supportably attached to each of said end portions of said belt means, said eye-bolt means having lower end portions operatively associated with peripheral edge portions of said bottom plate to removably secure the bottom plate to the bottom of the pipe to close the bottom opening thereof.

2. A protective container as defined in claim 1 wherein said means for attaching the pipe to a transmission cable support pole comprises bracket means having a first pair of legs fixedly secured to an outer wall surface of the pipe, and a second pair of oppositely disposed legs for frictional engagement with the side of a transmission cable support pole, and fastening means operatively associated with the bracket means for securement of the bracket means to a transmission cable support pole.

3. A protective container as defined in claim 1 wherein said means for attaching the pipe to a side of a transmission cable support pole comprises first and second, spaced I-beam shaped members located at upper and lower ends of said pipe, each member having a first pair of legs fixedly attached to an outer surface of the wall of the pipe, and a second pair of oppositely disposed legs for frictionally engaging the side of a transmission cable support pole, and fastening means operatively associated with each member for securing the member to the pole.

4. A protective container as defined in claim 1 wherein said bottom plate has a pair of oppositely disposed ear portions extending radially beyond the outer periphery of the wall of the pipe, each ear portion having an opening therein for receiving the lower end portion of each eye-bolt means for removable securement of the bottom plate to close the bottom opening of the pipe.

5. A protective container for aerially disposed splice packages of transmission cables comprising (a) an elongate cylindrical pipe formed of high-strength, projectile-resistant material for containing a transmission cable splice package therein;

(b) means for attaching the cylindrical pipe with its longitudinal cylindrical axis generally vertically disposed to a side of a transmission cable support pole, said attaching means comprising first and second generally rigid brackets of high strength attached to and extending beyond upper and lower end portions of the cylindrical pipe; each of said brackets having leg portions extending toward the pipe and fixedly secured to upper and lower side wall surfaces thereof, and spaced parallel leg portions extending away from said pipe for frictional abutting engagement of the edges thereof with said surfaces of a transmission cable support pole;

(c) a first generally circular, projectile-resistant top plate fixed to the top of the pipe in close, vertically-spaced relation to overlie the top opening of the pipe and provide a peripheral opening at the top of the pipe for passage of air;

(d) a second generally circular, projectile-resistant bottom plate secured to the bottom of the pipe to close the bottom opening thereof, said second plate having a radially disposed slot therein for passage of a transmission cable into and out of the pipe; and (e) support means in the pipe for supportably positioning a transmission cable splice package therein in spaced relation above the bottom plate of the container.

6. A protective container as defined in claim 5 wherein said brackets comprise first and second spaced I-beam-shaped members located at upper and lower ends of said pipe and extending beyond the ends of the same; each member comprising a first pair of generally parallel legs having outer edge portions fixedly secured to outer surfaces of respective upper and lower wall portions of the pipe, and a second pair of oppositely disposed spaced generally parallel legs having outer edge portions extending outwardly of the central axis of the pipe respectively above and below its respective upper and lower ends for frictional engagement with side surfaces of a transmission cable support pole, said first and second pairs of legs of each I-beam-shaped member being integrally interconnected by a straight central web portion having an opening therethrough disposed above the respective upper and lower end of said pipe, and fastening means extending through each of said openings for engagement with a transmission cable support pole to secure the I-beam-shaped members and protective container to the pole.

* * * * *

UNITED STATES PATENT AND TRADEMARK OFFICE
CERTIFICATE OF CORRECTION

PATENT NO. : 4,665,279
DATED : May 12, 1987
INVENTOR(S) : Gerald J. Ruschkofski and William A. Byrd It is certified that error appears in the above-identified patent and that said Letters Patent are hereby corrected as shown below:

Column 5, Line 13, change "belt" to --bolt--.

Signed and Sealed this

Tenth Day of November, 1987

Attest:

DONALD J. QUIGG

*Attesting Officer*          *Commissioner of Patents and Trademarks*